United States Patent
Lee et al.

(10) Patent No.: US 10,108,040 B2
(45) Date of Patent: Oct. 23, 2018

(54) LIQUID CRYSTAL DISPLAY AND METHOD OF MANUFACTURING THE SAME

(71) Applicant: LG DISPLAY CO., LTD., Seoul (KR)

(72) Inventors: Gunwoo Lee, Gangnueng-si (KR); Hyunwoo Jeon, Goyang-si (KR); Sangdae Han, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 29 days.

(21) Appl. No.: 15/297,796

(22) Filed: Oct. 19, 2016

(65) Prior Publication Data
US 2017/0123262 A1 May 4, 2017

(30) Foreign Application Priority Data
Oct. 30, 2015 (KR) .................. 10-2015-0152671

(51) Int. Cl.
*G02F 1/1335* (2006.01)
*F21V 8/00* (2006.01)

(52) U.S. Cl.
CPC ..... *G02F 1/133504* (2013.01); *G02B 6/0055* (2013.01); *G02F 1/133528* (2013.01); *G02F 1/133606* (2013.01); *G02B 6/0053* (2013.01); *G02B 6/0056* (2013.01); *G02B 6/0065* (2013.01); *G02F 2001/133607* (2013.01); *G02F 2201/50* (2013.01); *G02F 2202/023* (2013.01)

(58) Field of Classification Search
CPC .............................................. G02F 1/133504
See application file for complete search history.

(56) References Cited

U.S. PATENT DOCUMENTS

| | | | | |
|---|---|---|---|---|
| 2004/0228106 | A1* | 11/2004 | Stevenson | G02B 5/045 362/627 |
| 2008/0090010 | A1* | 4/2008 | Zhang | B82Y 30/00 427/372.2 |
| 2008/0135899 | A1* | 6/2008 | Park | H01L 27/14621 257/294 |
| 2009/0311633 | A1* | 12/2009 | Ito | G03F 7/022 430/323 |
| 2012/0249940 | A1* | 10/2012 | Choi | G02F 1/133753 349/123 |
| 2013/0295327 | A1* | 11/2013 | Zhang | B82Y 30/00 428/141 |

(Continued)

FOREIGN PATENT DOCUMENTS

| | | | | |
|---|---|---|---|---|
| CN | 201510618855 | * | 9/2015 | G02B 1/14 |
| JP | 2007-502010 A | | 2/2007 | |

(Continued)

*Primary Examiner* — Sang V Nguyen
(74) *Attorney, Agent, or Firm* — Seed IP Law Group LLP

(57) ABSTRACT

A liquid crystal display and a method of manufacturing the same are discussed. The liquid crystal display includes a display panel, a polarizer attached to a lower surface of the display panel, a support sheet positioned on a lower surface of the polarizer and integrated with the polarizer, a first UV resin layer positioned on a lower surface of the support sheet, and a first prism sheet positioned on a lower surface of the first UV resin layer and integrated with the support sheet. The first prism sheet includes a first base sheet and a prism portion positioned on the first base sheet and including at least one first prism pattern including a first hydrophobic portion.

13 Claims, 10 Drawing Sheets

(56) References Cited

U.S. PATENT DOCUMENTS

| | | | | |
|---|---|---|---|---|
| 2015/0077670 A1* | 3/2015 | Son | ................... | G02B 27/2214 |
| | | | | 349/33 |
| 2015/0260903 A1* | 9/2015 | Kashima | .............. | G02B 6/0056 |
| | | | | 349/65 |
| 2016/0259171 A1* | 9/2016 | Xiong | .................. | G02B 26/005 |
| 2016/0280906 A1* | 9/2016 | Kurosawa | ............ | C09D 153/00 |
| 2016/0291213 A1* | 10/2016 | Yoshida | ................... | G02B 1/14 |

FOREIGN PATENT DOCUMENTS

| | | | | | |
|---|---|---|---|---|---|
| JP | 2013-107281 | * | 6/2013 | ............... | B32B 7/06 |
| JP | 2013107281 | * | 6/2013 | ............... | B32B 7/06 |
| JP | 2013-543990 A | | 12/2013 | | |
| JP | 2015-067290 | * | 3/2015 | ............. | C08L 53/00 |
| KR | 10-2012-0014460 | * | 2/2012 | ............. | G02B 5/04 |
| KR | 10-2012-0014460 A | | 2/2012 | | |
| KR | 10-2013-0035538 | * | 4/2013 | ............. | H01L 51/50 |

* cited by examiner

LIQUID CRYSTAL DISPLAY AND METHOD OF MANUFACTURING THE SAME

This application claims the priority benefit of Korean Patent Application No. 10-2015-0152671 filed on Oct. 30, 2015, which is incorporated herein by reference for all purposes as if fully set forth herein.

BACKGROUND

Technical Field

The present disclosure relates to a liquid crystal display including an optical film embedded therein. In particular, the present disclosure relates to a liquid crystal display having a structure, in which an optical film for uniformity and concentration of light provided by a backlight unit is attached to a lower polarizer, and a method of manufacturing the liquid crystal display.

Description of the Related Art

A range of application for liquid crystal displays has gradually widened because of its excellent characteristics such as light weight, thin profile, and low power consumption. The liquid crystal displays have been used in personal computers such as notebook PCs, office automation equipments, audio/video equipments, interior/outdoor advertising display devices, and the like. A transmissive liquid crystal display occupying most of the liquid crystal displays controls an electric field applied to a liquid crystal layer and modulates light incident from a backlight unit, thereby displaying an image.

A backlight unit is classified into a direct type backlight unit and an edge type backlight unit. The direct type backlight unit is configured such that a plurality of light sources is disposed under a liquid crystal display panel. The edge type backlight unit is configured such that light sources are disposed opposite the side of a light guide plate, and a plurality of optical films is disposed between a liquid crystal display panel and the light guide plate. In the edge type backlight unit, the light source irradiates light onto one side of the light guide plate, and the light guide plate converts linear light or point light into surface light. The edge type backlight unit has an advantage over the direct type backlight unit of being thinner.

A liquid crystal display including an edge type backlight unit according to a related art is described below with reference to FIGS. 1 and 2. FIG. 1 is an exploded perspective view illustrating a structure of a liquid crystal display including an edge type backlight unit according to a related art. FIG. 2 is a cross-sectional view taken along line I-I' of FIG. 1.

Referring to FIGS. 1 and 2, a related art liquid crystal display includes a liquid crystal display panel LCP and an edge type backlight unit EBLU disposed below the liquid crystal display panel LCP. The liquid crystal display panel LCP includes an upper glass substrate SU, a lower glass substrate SL, and a liquid crystal layer LC between the upper and lower glass substrates SU and SL and may be implemented in any liquid crystal mode.

The edge type backlight unit EBLU includes a light source LS, a light guide plate LG, and an optical film OPT. The edge type backlight unit EBLU converts light emitted from the light source LS into uniform surface light through the light guide plate LG and the optical film OPT and provides the liquid crystal display panel LCP with the uniform surface light. The edge type backlight unit EBLU may further include a reflective plate REF, that is positioned below the light guide plate LG and returns light leaked through a lower surface of the light guide plate LG to the light guide plate LG.

A cover bottom CB is disposed below the reflective plate REF. It is preferable, but not required, that the cover bottom CB has a container shape for containing the edge type backlight unit EBLU therein. Further, the cover bottom CB includes a material with high heat conductivity and high rigidity, in order to smoothly dissipate heat from the light source LS to the outside. For example, the cover bottom CB may be made of a metal plate, such as aluminum (Al), aluminum nitride (AlN), electrolytic galvanized iron (EGI), steel use stainless (SUS), galvalume steel coil (SGLC), aluminum coated steel (ALCOSTA), and steel plated tin (SPTE). Further, a material with high conductivity for accelerating heat transfer may be coated on the metal plate.

A guide panel GP and a top case TC are disposed at an edge of the liquid crystal display panel LCP. The guide panel GP is a rectangular mold frame, in which a glass fiber is mixed in a synthetic resin, for example, polycarbonate. The guide panel GP surrounds an upper edge and a side of the liquid crystal display panel LCP and a side of the edge type backlight unit EBLU. The guide panel GP supports the liquid crystal display panel LCP and uniformly maintains a distance between the liquid crystal display panel LCP and the optical film OPT. The top case TC is made of a metal material, for example, zinc coated steel and has a structure surrounding an upper surface and a side of the guide panel GP. The top case TC is fixed to at least one of the guide panel GP and the cover bottom CB using a hook or a screw.

It is preferable, but not required, that the light source LS uses a light emitting device (for example, a light emitting diode (LED)) having a high luminance using low electric power. The light source LS of the edge type backlight unit EBLU provides light for the light guide plate LG. The light source LS of the edge type backlight unit EBLU is positioned on the side of the liquid crystal display panel LCP. Namely, the light source LS is positioned corresponding to at least one side of the light guide plate LG and provides light for the side of the light guide plate LG.

The light guide plate LG has a rectangular cuboid panel shape having a face corresponding to an area of the liquid crystal display panel LCP. An upper surface of the light guide plate LG is positioned opposite the liquid crystal display panel LCP. The light guide plate LG receives light from the light source LS positioned on the side of the light guide plate LG and evenly diffuses and distributes the light inside the light guide plate LG, thereby functioning to induce light to the upper surface of the light guide plate LG, on which the liquid crystal display panel LCP is disposed.

It is not proper to use light induced to the liquid crystal display panel LCP by the light guide plate LG as backlight. For example, the light may not have a uniform luminance distribution throughout the entire area of the liquid crystal display panel LCP. Alternatively, the light may not be concentrated on the surface of the liquid crystal display panel LCP in a main observer direction. Thus, the light needs to be concentrated and diffused, so that the light is completely used as the backlight.

The optical film OPT is disposed between the light guide plate LG and the liquid crystal display panel LCP for the above-described functions. A structure of the optical film OPT according to the related art is described below with reference to FIGS. 3 and 4. FIG. 3 is a cross-sectional view illustrating a structure of an optical film including a diffusion film in a liquid crystal display according to a related art.

As shown in FIG. 3, an optical film OPT disposed at a lower part of the liquid crystal display LCP has a stack structure of generally widely used optical films. For example, the optical film OPT may have a structure, in which a lower prism sheet PRL, an upper prism sheet PRU, and a diffusion sheet DIF are sequentially stacked.

Triangular prism patterns are disposed on an upper surface of the lower prism sheet PRL. In particular, peaks and valleys of the triangular prism patterns are alternately disposed, and the peaks are arranged in parallel with one another in a first direction. The upper prism sheet PRU may have the same pattern as the lower prism sheet PRL. However, it is preferable, but not required, that triangular prism patterns of the upper prism sheet PRU are arranged in a second direction perpendicular to the first direction. Light emitted from the light guide plate LG passes through the lower prism sheet PRL and the upper prism sheet PRU and is concentrated to have a Gaussian distribution with respect to a normal line to the surface of the liquid crystal display LCP.

The diffusion sheet DIF evenly distributes light passing through the prism sheets PRL and PRU to the entire surface of the liquid crystal display panel LCP, thereby achieving a uniform luminance distribution. For example, in an edge type backlight unit, a side occupied by a light source may have a luminance greater than a side opposite the side. Further, in a direct type backlight unit, a formation portion of the light source may have a luminance greater than a portion around the light source. Namely, the diffusion sheet DIF causes a non-uniform luminance distribution of light over the entire surface of the liquid crystal display panel LCP to change a uniform luminance distribution. For a diffusion function, the diffusion sheet DIF may include beads BD distributed on an upper surface of the diffusion sheet DIF.

Light may be changed to a state suitable to use as the backlight by the prism sheets PRL and PRU and the diffusion sheet DIF. However, as light passes through the optical film OPT, a luminance of the light is reduced. This reduces an energy efficiency required to generate the backlight. In particular, the diffusion sheet DIF seriously affects a reduction in the luminance. In order to solve this, a dual brightness enhancement film has been proposed. FIG. 4 is a cross-sectional view illustrating a structure of an optical film including a dual brightness enhancement film in a liquid crystal display according to a related art.

A dual brightness enhancement film has a structure, in which a high refractive layer and a low refractive layer are stacked. Hence, the dual brightness enhancement film again reflects light, that is lost by a reflection, on its upper surface and prevents a reduction in the luminance. An optical film OPT shown in FIG. 4 has substantially the same structure as the optical film OPT shown in FIG. 3, except that a dual brightness enhancement film DBEF is used instead of the diffusion sheet DIF.

As described above, the related art optical film OPT has the structure, in which the components are sequentially stacked between the liquid crystal display panel LCP and the light guide plate LG. Namely, the upper prism sheet PRU is laid down on the lower prism sheet PRL. Thus, a predetermined air layer is formed between the upper prism sheet PRU and the lower prism sheet PRL. Because the air layer has a refractive index different from the prism sheets PRL and PRU, light passing through the air layer can be diffused.

The diffusion sheet DIF or the dual brightness enhancement film DBEF is laid down on the upper prism sheet PRU. Therefore, a predetermined air layer is formed between the upper prism sheet PRU and the diffusion sheet DIF or between the upper prism sheet PRU and the dual brightness enhancement film DBEF. As described above, light passing through the air layer can be further diffused.

However, the related art optical film OPT becomes thick because of its stack structure and is a barrier to a thin profile of the liquid crystal display. An ultra-thin profile of the liquid crystal display has been attempted by attaching the components of the optical film OPT. However, when the components of the optical film OPT are simply attached, the air layer is not formed. Therefore, a diffusion effect resulting from the air layer cannot be obtained, and the luminance distribution is not uniform. Further, moiré, rainbow mura, or hotspot fringe may be generated. Moisture penetrates between the peaks of the prism sheet by a capillary phenomenon, causing degradation in image quality. The backlight unit having the non-uniform luminance, the fringe generation, the moisture penetration, etc., was evaluated as unfit to provide the backlight. Thus, the ultra-thin profile of the related art liquid crystal display cannot be achieved.

BRIEF SUMMARY

Accordingly, the present disclosure is directed to a liquid crystal display and a method of manufacturing the same that substantially obviate one or more of the problems due to limitations and disadvantages of the related art.

The present disclosure provides an ultra-thin profile liquid crystal display including an optical film integrated therewith.

The present disclosure also provides a liquid crystal display capable of preventing moisture penetration caused by a capillary phenomenon generated in a valley of a prism portion of a prism sheet by forming a portion of the prism portion using a hydrophobic material.

The present disclosure also provides an ultra-thin profile liquid crystal display including an optical film manufactured by integrating and attaching a lower polarizer, a support sheet, and a prism sheet.

In one aspect, there is provided a liquid crystal display including a display panel, a polarizer attached to a lower surface of the display panel, a support sheet positioned on a lower surface of the polarizer and integrated with the polarizer, a first UV resin layer positioned on a lower surface of the support sheet, and a first prism sheet positioned on a lower surface of the first UV resin layer and integrated with the support sheet, wherein the first prism sheet includes a first base sheet and a prism portion positioned on the first base sheet and including at least one first prism pattern including a first hydrophobic portion.

The first prism pattern further includes a hydrophilic portion on the first hydrophobic portion.

The first hydrophobic portion is made of a hydrophobic material, and the hydrophilic portion is made of a hydrophilic material.

Some of the potential features according to one embodiment will now be described. The hydrophilic portion is a portion of the first prism pattern inserted into the first UV resin layer, and the first hydrophobic portion is a remaining portion except the hydrophilic portion from the first prism pattern.

The prism portion further includes at least one second prism pattern having a height less than a height of the first prism pattern. The second prism pattern is entirely composed of a second hydrophobic portion.

A height of the hydrophilic portion is 1% to 20% with respect to a total height of 100% of the first prism pattern.

The height of the hydrophilic portion is 1 μm to 10 μm.

A plan area of the hydrophilic portion is 1% to 10% with respect to a total plan area of 100% of the first prism sheet.

The liquid crystal display further includes a second UV resin layer on a lower surface of the first prism sheet and a second prism sheet on a lower surface of the second UV resin layer.

The second prism sheet includes a second base sheet and a prism portion positioned on the second base sheet and including at least one third prism pattern including a third hydrophobic portion.

The polarizer at least includes a core layer.

The polarizer further includes a protective layer on at least one surface of the core layer.

The liquid crystal display further includes a backlight unit providing light for a lower part of the display panel, the backlight unit including a light source, a light guide plate, and a reflective plate.

As can be appreciated, not all embodiments will have each of the features just listed.

In another aspect, there is provided a method of manufacturing a liquid crystal display including inserting a base sheet roll into a first roller, applying a mixed resin of a hydrophobic resin and a hydrophilic resin to the base sheet roll, and forming a prism sheet roll including a first prism pattern using a hard mold, inserting the prism sheet roll into a second roller, inserting a support sheet roll into a third roller and forming an UV resin layer on the support sheet roll, attaching the prism sheet roll to the support sheet roll using a compression roller and performing UV curing on the prism sheet roll to form a hydrophobic portion and a hydrophilic portion in the first prism pattern of the prism sheet roll, attaching the support sheet roll, that is attached to the prism sheet roll, to a polarizer sheet roll and cutting them to manufacture an optical film, and attaching the optical film to a lower surface of a display panel.

The forming of the hydrophobic portion and the hydrophilic portion in the first prism pattern of the prism sheet roll includes phase-separating the mixed resin forming the first prism pattern into the hydrophobic portion and the hydrophilic portion when the UV curing is performed on the prism sheet roll.

BRIEF DESCRIPTION OF THE SEVERAL VIEWS OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 5:
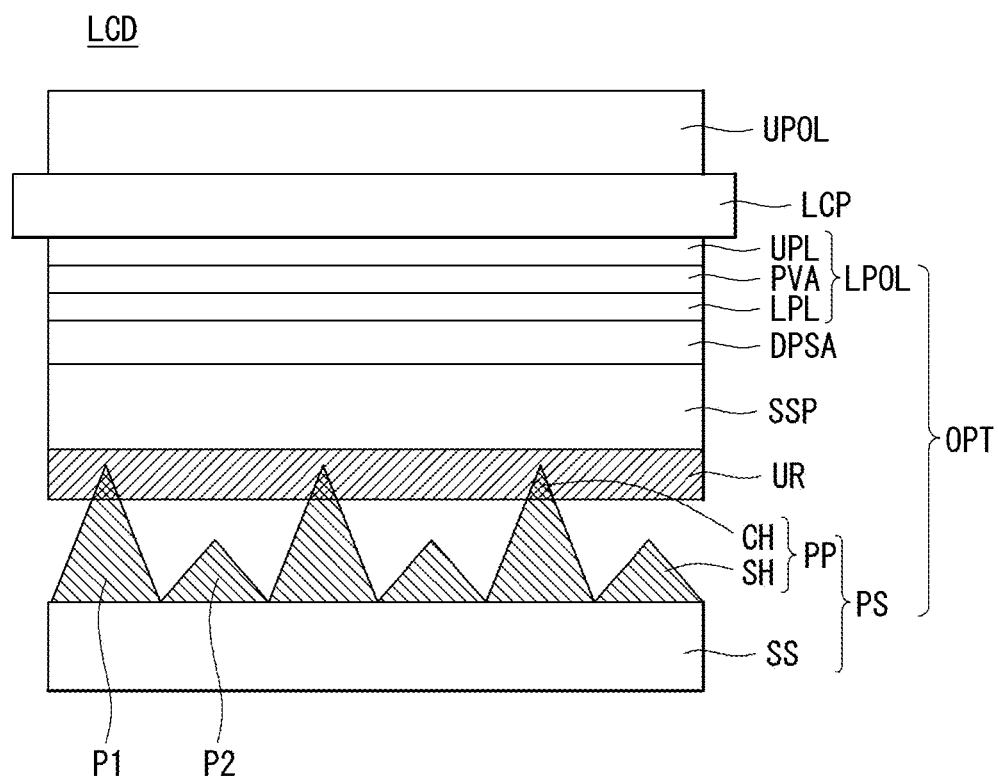
FIG. 5 is a cross-sectional view illustrating a structure of a liquid crystal display according to a first embodiment of the invention.
Figure 6:
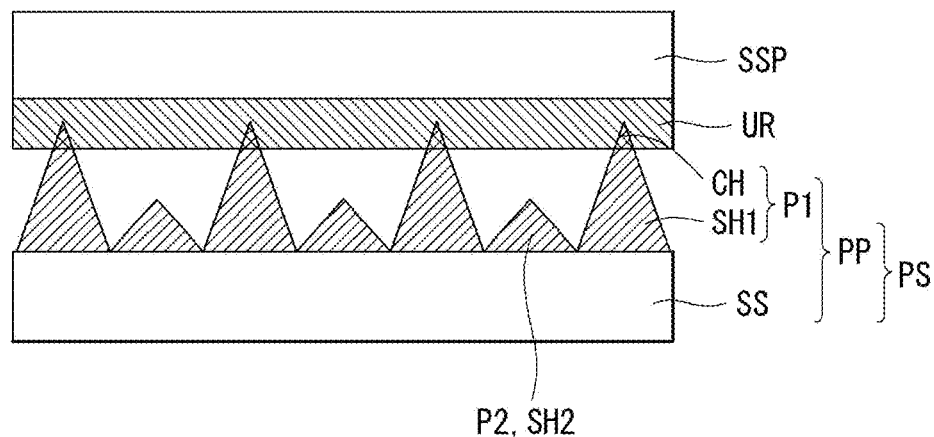
FIG. 6 is a cross-sectional view illustrating a structure of a prism sheet according to a first embodiment of the invention.
Figure 7:
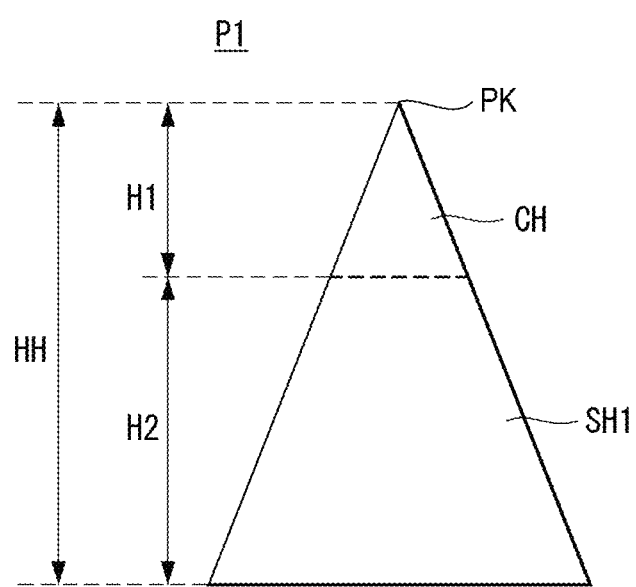
FIG. 7 is a cross-sectional view illustrating a structure of a prism pattern according to a first embodiment of the invention.
Figure 8:
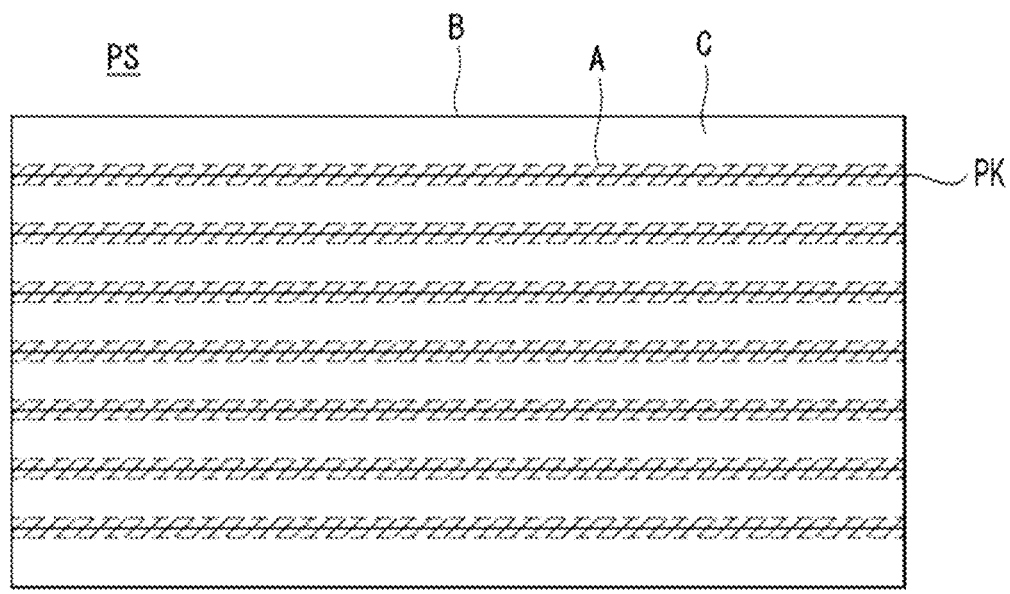
FIG. 8 is a plan view illustrating a structure of a prism sheet according to a first embodiment of the invention.
Figure 9:
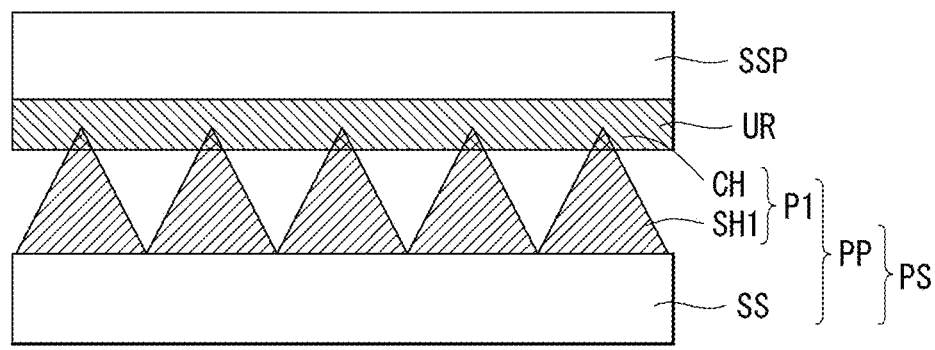
FIG. 9 is a plan view illustrating another structure of a prism sheet according to a first embodiment of the invention.

FIG. 5 is a cross-sectional view illustrating a structure of a liquid crystal display according to a first embodiment of the invention. FIG. 6 is a cross-sectional view illustrating a structure of a prism sheet according to a first embodiment of the invention. FIG. 7 is a cross-sectional view illustrating a structure of a prism pattern according to a first embodiment of the invention. FIG. 8 is a plan view illustrating a structure of a prism sheet according to a first embodiment of the invention. FIG. 9 is a plan view illustrating another structure of a prism sheet according to a first embodiment of the invention.

Referring to FIGS. 5 and 6, a liquid crystal display LCD according to a first embodiment of the invention includes a liquid crystal display panel LCP, an upper polarizer UPOL, and an optical film OPT. The optical film OPT includes a lower polarizer LPOL, a support sheet SSP, an ultraviolet (UV) resin layer UR, and a prism sheet PS.

The liquid crystal display panel LCP includes an upper substrate and a lower substrate that are attached to each other with a liquid crystal layer interposed therebetween. The upper polarizer UPOL is attached to an upper surface of the liquid crystal display panel LCP, and the lower polarizer LPOL is attached to a lower surface of the liquid crystal display panel LCP.

The upper polarizer UPOL has a first light transmission axis or a first light shielding axis aligned in a first direction. The lower polarizer LPOL has a second light transmission axis or a second light shielding axis aligned in a second direction. When the liquid crystal display LCD is in a normally black mode, it is preferable, but not required, that the first light transmission axis and the second light transmission axis are perpendicular to each other. On the other hand, when the liquid crystal display LCD is in a normally white mode, the first light transmission axis and the second light transmission axis may be parallel to each other.

The lower polarizer LPOL includes a core layer PVA, and an upper protective layer UPL and a lower protective layer LPL respectively attached to both surfaces of the core layer PVA. The core layer PVA is easily deformed by moisture included in an air. Thus, the upper protective layer UPL and the lower protective layer LPL are respectively attached to both surfaces of the core layer PVA. The lower polarizer LPOL is attached to the liquid crystal display panel LC through an adhesive layer (not shown).

The embodiment of the invention described that the lower polarizer LPOL includes the upper protective layer UPL, the lower protective layer LPL, and the core layer PVA positioned between them. However, at least one of the upper protective layer UPL and the lower protective layer LPL may be omitted.

A pressure sensitive adhesive (PSA) layer DPSA is positioned on a lower surface of the lower polarizer LPOL and attaches the lower polarizer LPOL to the support sheet SSP. The PSA layer DPSA may use a material, for example, acrylic copolymer having good elasticity and good adhesive characteristic and capable of preventing the peeling by reducing the generation of fine bubbles. Further, the PSA layer DPSA may protect the sheets from an external impact through its elasticity as well as an adhesive function. In addition, the PSA layer DPSA may perform a diffusion function because it includes a plurality of beads.

The support sheet SSP is positioned below the lower polarizer LPOL through the PSA layer DPSA. The support sheet SSP transmits light incident from a light source and performs a support function so that the lower polarizer LPOL is attached to the prism sheet PS positioned below the support sheet SSP. To this end, the support sheet SSP may be made of a material capable of transmitting light incident from the light source and having a high resistance to moisture in an air. For example, the support sheet SSP may be made of any one selected from the group consisting of polyethylene terephthalate (PET), polycarbonate (PC), polypropylene (PP), polyethylene (PE), polystyrene (PS), and polyepoxy, but is not limited thereto. The support sheet SSP may have a thin thickness of 10 μm to 250 μm, so as to meet a thin profile of a backlight unit. When the thickness of the support sheet SSP is equal to or greater than 10 μm, the thin profile of the backlight unit may be maximally achieved to the extent that mechanical properties and a thermal resistance of the optical film OPT are not reduced. Further, when the thickness of the support sheet SSP is equal to or less than 250 μm, the thin profile of the backlight unit may be achieved, and also the mechanical properties and the thermal resistance of the optical film OPT may be maximized.

The UV resin layer UR is positioned below the support sheet SSP and attaches the prism sheet PS to the support sheet SSP. The UV resin layer UR may use a resin having adhesive characteristic and UV curing characteristic. For example, the UV resin layer UR may use an epoxy-based resin, a polyester-based resin, or an acrylic-based resin including a urethane-based resin, etc. It is preferable, but not required, that the UV resin layer UR has a thickness of 1 μm to 50 μm, so as to efficiently attach the prism sheet PS to the support sheet SSP.

The prism sheet PS is positioned below the UV resin layer UR. The prism sheet PS includes a prism portion PP, in which prism patterns are formed on a base sheet SS.

The base sheet SS transmits light incident from the light source and protects the prism portion PP of the prism sheet PS. To this end, the base sheet SS may be made of a material capable of transmitting light incident from the light source and having a high resistance to moisture in an air. For example, the base sheet SS may be made of any one selected from the group consisting of polyethylene terephthalate (PET), polycarbonate (PC), polypropylene (PP), polyethylene (PE), polystyrene (PS), and polyepoxy, but is not limited thereto. The base sheet SS may have a thin thickness of 10 μm to 250 μm, so as to meet the thin profile of the backlight unit. When the thickness of the base sheet SS is equal to or greater than 10 μm, the thin profile of the backlight unit may be maximally achieved to the extent that the mechanical properties and the thermal resistance of the optical film OPT are not reduced. Further, when the thickness of the base sheet SS is equal to or less than 250 μm, the thin profile of the backlight unit may be achieved, and also the mechanical properties and the thermal resistance of the optical film OPT may be maximized.

The prism portion PP is positioned on the base sheet SS and may concentrate light incident from the light source by a plurality of prism patterns. The prism portion PP includes first prism patterns P1 each having a first height and second prism patterns P2 each having a second height. The first height and the second height are different from each other.

The liquid crystal display according to the embodiment of the invention has the structure, in which the prism sheet PS is attached to the support sheet SSP using the UV resin layer UR. In particular, it is preferable, but not required, that some of the plurality of prism patterns P1 and P2 of the prism portion PP included in the prism sheet PS are inserted into the UV resin layer UR. The prism sheet PS is configured such that the first prism patterns P1 having the first height and the second prism patterns P2 having the second height are alternately arranged. Therefore, it is preferable, but not required, that a portion of a peak of one of the first and second prism patterns, that has the height greater than the other, is inserted into the UV resin layer UR. For example, when the first height is greater than the second height, a portion of each first prism pattern P1 having the first height may be inserted into the UV resin layer UR.

Even if a portion of at least one first prism pattern P1 is inserted into the UV resin layer UR, the second prism patterns P2 are spaced apart from the UV resin layer UR at a predetermined distance. Namely, an air layer may be interposed between the UV resin layer UR and the second prism patterns P2. If peaks of the prism portion PP of the prism sheet PS do not have different heights, all of the peaks of the prism portion PP may be inserted into the UV resin layer UR. Therefore, an amount of the air layer may greatly decrease, and light concentration characteristic may be reduced. As a result, light may not be sufficiently refracted, and a luminance reduction may be generated. Thus, as in the embodiment of the invention, the first prism pattern P1 and the second prism pattern P2 are preferred to be formed at different heights. In the embodiment of the invention, because the prism patterns P1 and P2 of the prism portion PP of the prism sheet PS have the different heights, the air layer can be sufficiently secured between the prism patterns P1 and P2 and the UV resin layer UR, and a luminance loss can be reduced.

Referring to FIG. 6, at least one first prism pattern P1 of the prism sheet PS according to the embodiment of the invention includes a hydrophilic portion CH and a first hydrophobic portion SH1, and the second prism pattern P2 includes a second hydrophobic portion SH2.

The first prism pattern P1 is a pattern, of which a portion is inserted into the UV resin layer UR. The first prism pattern P1 includes a hydrophilic portion CH, that is a portion inserted into the UV resin layer UR, and a first hydrophobic portion SH1, that is a remaining portion that is not part of the hydrophilic portion CH of the first prism pattern P1. The hydrophilic portion CH of the first prism pattern P1 is made of a hydrophilic material and is a portion that is inserted into the UV resin layer UR and is substantially attached to the prism sheet PS. The hydrophilic portion CH of the first prism pattern P1 according to the embodiment of the invention shows hydrophilic properties and thus can be well attached to the UV resin layer UR. The first hydrophobic portion SH1 of the first prism pattern P1 is made of a hydrophobic material and is a remaining portion outside of the resin layer UR and is that portion of the first prism pattern P1 that is not CH. The first hydrophobic portion SH1 of the first prism pattern P1 has properties that make it repel a liquid, for example, in one embodiment, it makes a contact angle equal to or greater than 90° with a liquid and thus shows low contact characteristic with respect to moisture. Because the second prism pattern P2 is not inserted into the UV resin layer UR, the second prism pattern P2 may be entirely composed of the second hydrophobic portion SH2.

The first hydrophobic portion SH1 of the first prism pattern P1 and the second hydrophobic portion SH2 of the second prism pattern P2 may be made of phenoxyethyl acrylate, o-phenoxyethyl acrylate, bisphenol-A epoxy acrylate, bisphenyl fluorine acrylate, etc. Further, the hydrophilic portion CH of the first prism pattern P1 may be made of polyester acrylate oligomer, epoxy acrylate, a composition of urethane acrylate, etc., which are generally used as a prism resin.

The prism sheet PS according to the embodiment of the invention is attached to the support sheet SSP through the UV resin layer UR. Thus, a space between the prism portion PP of the prism sheet PS and the UV resin layer UR communicates with the outside to form an air layer. When the sheets are exposed to external moisture, a space between the first and second patterns P1 and P2 of the prism portion PP serves as a tube, generating a capillary phenomenon. Hence, moisture penetrates through the tube. The capillary phenomenon is the absorption of a liquid along a thin tube (i.e., a capillary tube) and is a movement of a liquid in a space of a porous material by an adhesive force, a cohesion force, and a surface tension. The capillary phenomenon is reduced by removing or weakening one of causes generating the adhesive force, the cohesion force, and the surface tension.

The embodiment of the invention reduces an adhesive force between the prism portion PP of the prism sheet PS and a liquid by forming a portion of the prism portion PP, that is exposed to the outside, using the hydrophobic material, thereby reducing the capillary phenomenon. More specifically, the embodiment of the invention can prevent the external moisture from penetrating between the prism sheet PS and the UV resin layer UR by forming the first hydrophobic portion SH1 of the first prism pattern P1 and the second hydrophobic portion SH2 of the second prism pattern P2, that are exposed to the outside, using the hydrophobic material.

Referring to FIG. 7, in the embodiment of the invention, the hydrophilic portion CH and the first hydrophobic portion SH1 of the first prism pattern P1 each have a predetermined height. A height H1 of the hydrophilic portion CH of the first prism pattern P1 is 1% to 20% of a total height HH of the first prism pattern P1. When the height H1 of the hydrophilic portion CH is equal to or greater than 1% of the total height HH of the first prism pattern P1, adhesive reliability between the prism sheet PS and the UV resin layer UR can be improved. Further, when the height H1 of the hydrophilic portion CH is equal to or less than 20% of the total height HH of the first prism pattern P1, the embodiment of the invention can prevent a reduction in the light concentration characteristic resulting from the insufficient refraction of light due to a decrease in an amount of the air layer between the prism sheet PS and the UV resin layer UR. A height H2 of the first hydrophobic portion SH1 of the first prism pattern P1 is 80% to 99% of the total height HH of the first prism pattern P1. The height H1 of the hydrophilic portion CH of the first prism pattern P1 may be 1 μm to 10 μm.

Referring to FIG. 8, the hydrophilic portions CH of the first prism patterns P1 of the prism sheet PS will have more than a selected area of contact with UR to provide for the adhesive force between the prism sheet PS and the UV resin layer UR. In the embodiment of the invention, a plan area A of the hydrophilic portions CH of the first prism patterns P1 of the prism sheet PS may be 1% to 10% with respect to a total plan area B of 100% of the prism sheet PS. When the plan area A of the hydrophilic portions CH is equal to or greater than 1% with respect to the total plan area B of 100% of the prism sheet PS, the adhesive reliability between the prism sheet PS and the UV resin layer UR can be improved. Further, when the plan area A of the hydrophilic portions CH is equal to or less than 10% with respect to the total plan area B of 100% of the prism sheet PS, the embodiment of the invention can prevent a reduction in the light concentration characteristic. It is therefore preferred that top plan view of area A be in the range of 1% to 10% of the total plan area B of the entire sheet. Namely, the area A is preferably within the following range: 1%≤A≤10%. A plan area C of the first hydrophobic portions SH1 of the first prism patterns P1 of the prism sheet PS may be equal to or less than 90% with respect to the total plan area B of 100% of the prism sheet PS.

As shown in FIGS. 7 and 8, the prism P1 will have a peak point Pk. This peak Pk is inserted into the resin layer UR to the depth H1. This means an area A will be embedded into the UR, from a plan view, as can be seen in FIGS. 7 and 8. The area A is the area occupied from a plan view of FIG. 8. Since the prism P1 has a slope, the area that is in contact with the layer UR will be much greater than area A. The amount of area in contact with the layer UR will be determined by the height H1 and the angle of the prism using any well-known geometry rule, such as the Pythagorean Theorem, cosine law, sine law, etc. It will thus be appreciated that the area A is the area occupied in the plan view of the prism and not the area of the prism that is in physical contact with layer UR.

In the prism portion PP of the prism sheet PS according to the embodiment of the invention, the first and second prism patterns P1 and P2 may overlap each other, or may be spaced apart from each other. Further, the first and second prism patterns P1 and P2 may be formed in a continuous or discontinuous pattern. Further, heights of the peaks of the first and second prism patterns P1 and P2 in a longitudinal direction may be constant or may vary. Further, pitches of the first and second prism patterns P1 and P2 may be constant or may vary. However, the embodiment of the invention is not limited thereto. For example, the prism portion PP may have various lengths and shapes, that may be formed using a known method.

Referring to FIG. 9, unlike the prism sheet PS described above, a prism sheet PS according to the first embodiment of the invention may include a prism portion PP composed of only first prism patterns P1 on a base sheet SS. In this instance, all of the first prism patterns P1 are inserted into the UV resin layer UR and each include a hydrophilic portion CH and a first hydrophobic portion SH1. Since configurations of the hydrophilic portion CH and the first hydrophobic portion SH1 are described above, a further description may be briefly made or may be entirely omitted.

Figure 1:
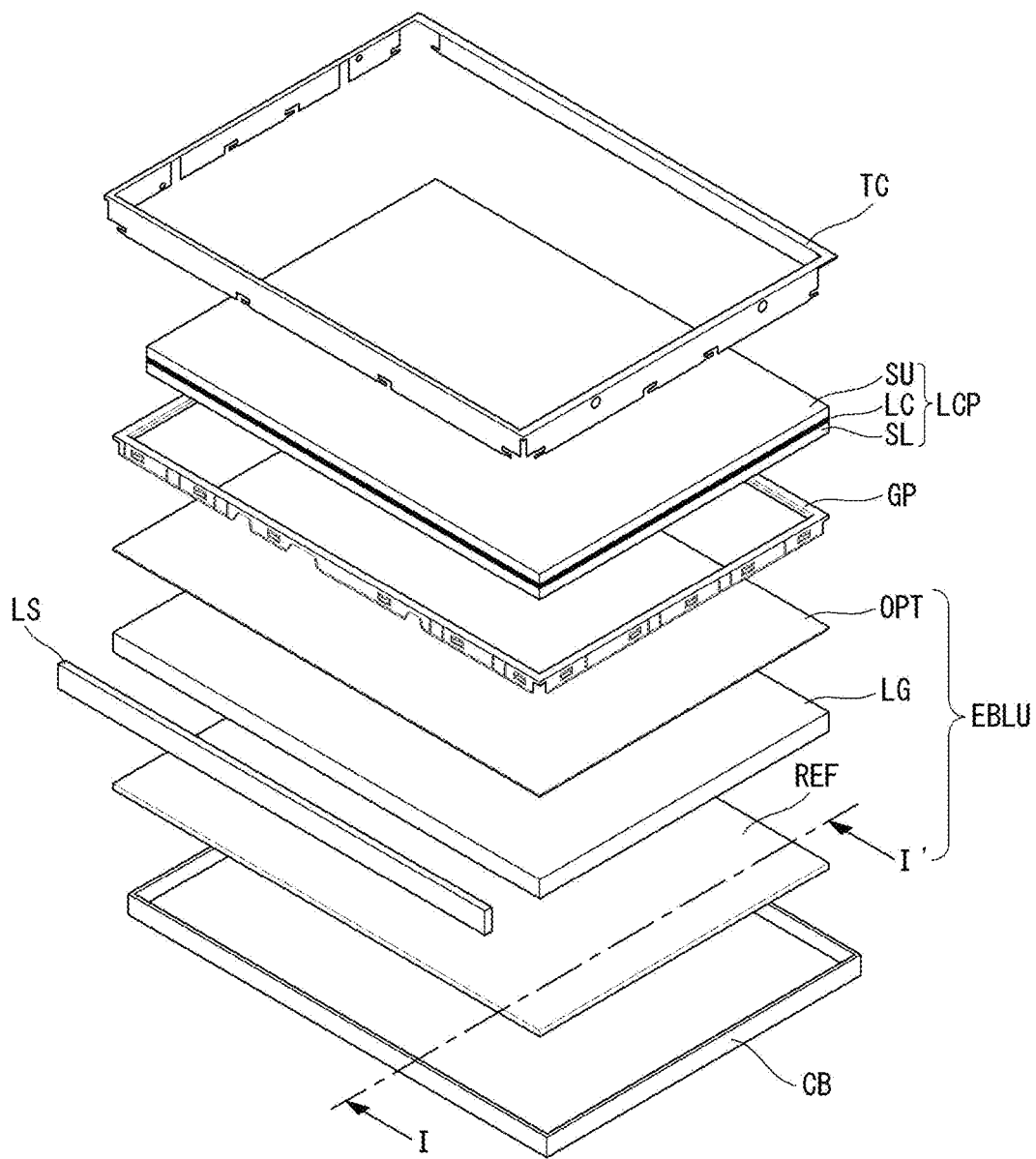
FIG. 1 is an exploded perspective view illustrating a structure of a liquid crystal display including an edge type backlight unit according to a related art.
Figure 2:
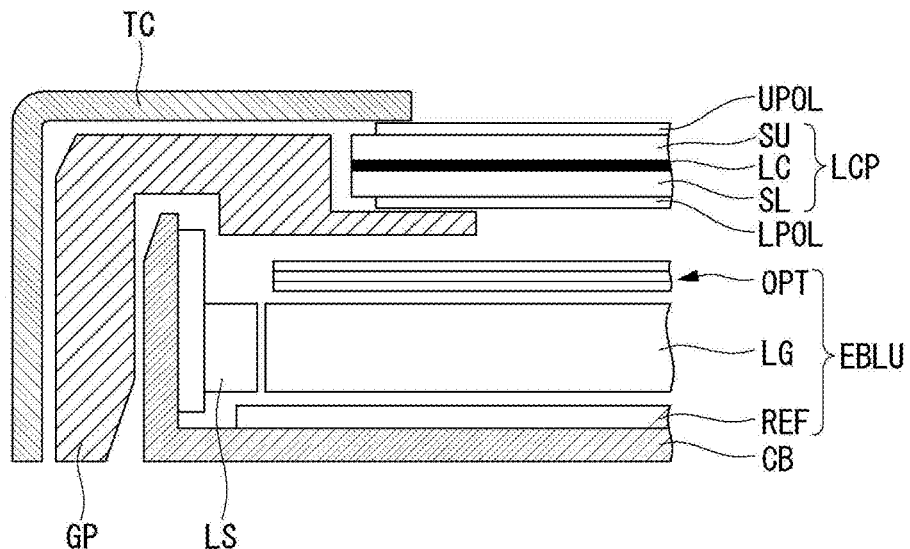
FIG. 2 is a cross-sectional view taken along line I-I' of FIG. 1.
Figure 3:
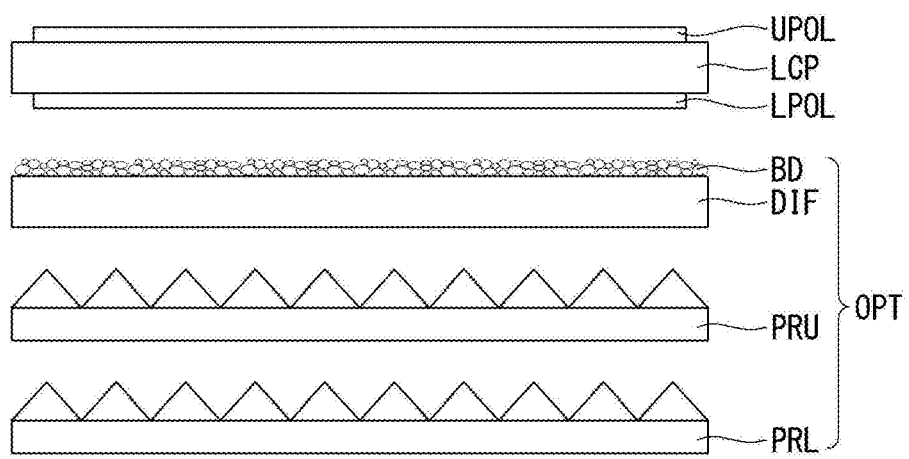
FIG. 3 is a cross-sectional view illustrating a structure of an optical film including a diffusion film in a liquid crystal display according to a related art.
Figure 4:
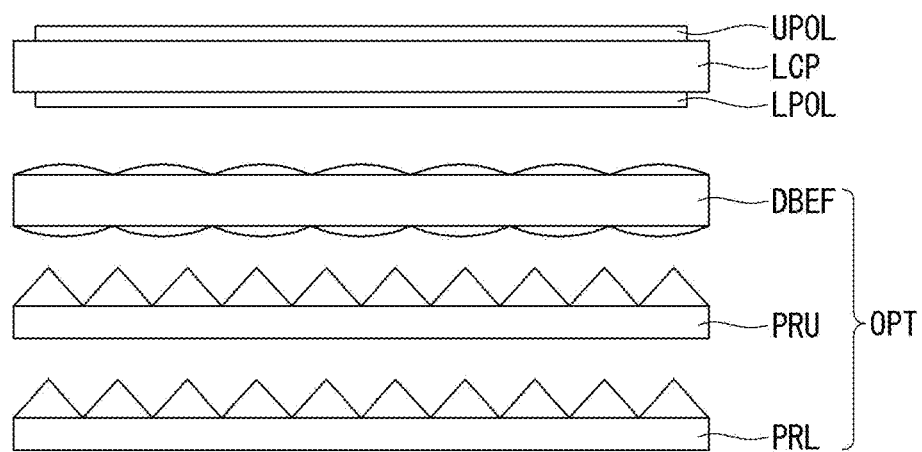
FIG. 4 is a cross-sectional view illustrating a structure of an optical film including a dual brightness enhancement film in a liquid crystal display according to a related art.

The liquid crystal display according to the embodiment of the invention includes a backlight unit below the liquid crystal display panel LCP, to which the above-described optical film OPT is attached. The backlight unit according to the embodiment of the invention may be the backlight unit shown in FIG. 1. The backlight unit according to the embodiment of the invention may include a light source LS, a light guide plate LG, and a reflective plate. In particular, the backlight unit according to the embodiment of the invention does not include a separate optical film, and the separate optical film may be replaced by the optical film OPT attached to the liquid crystal display panel LCP. However, the backlight unit according to the embodiment of the invention may include an additional optical film (for example, a diffusion sheet). Thus, the backlight unit positioned below the liquid crystal display panel LCP may provide light for the liquid crystal display panel LCP.

As described above, the embodiment of the invention can omit the separate optical film by integrating and attaching the lower polarizer, the support sheet, and the prism sheet, that are positioned below the liquid crystal display panel, and can reduce a thickness of the backlight unit. Hence, the thin profile of the liquid crystal display can be maximally achieved.

A method of manufacturing the prism sheet according to the first embodiment of the invention is described below.

Figure 10:
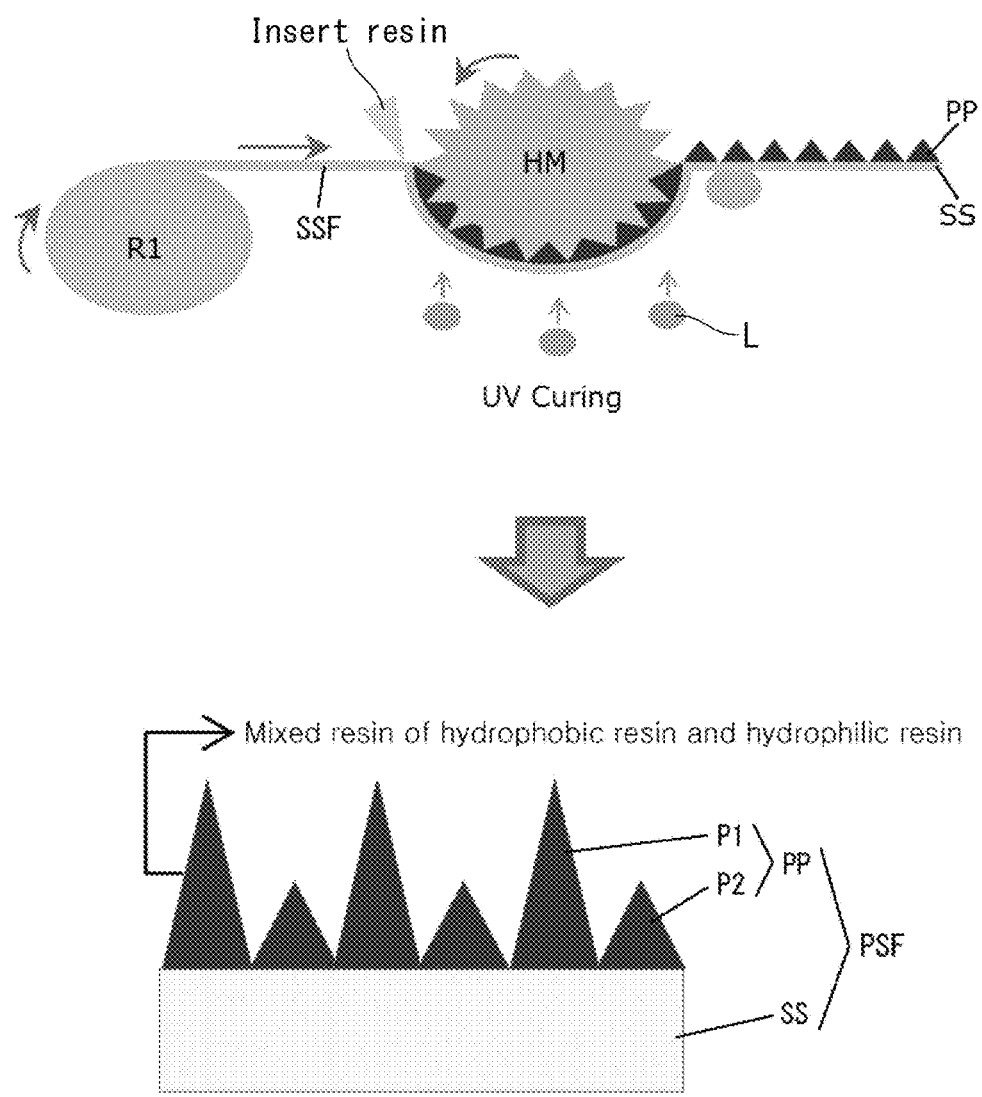
FIG. 10 illustrates a process for manufacturing a prism sheet according to a first embodiment of the invention.
Figure 11:
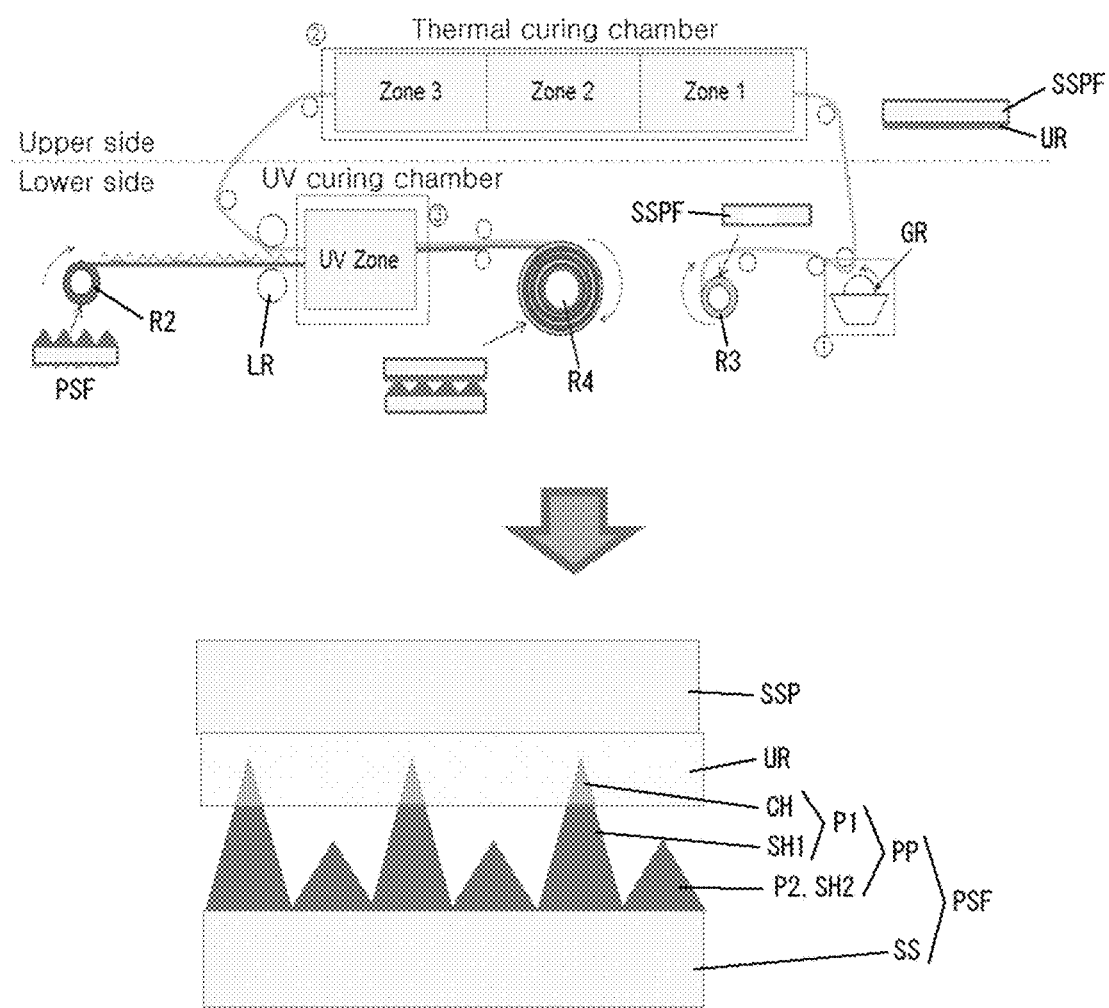
FIG. 11 illustrates a process for attaching a prism sheet to a support sheet.

FIG. 10 illustrates a process for manufacturing a prism sheet according to the first embodiment of the invention. FIG. 11 illustrates a process for attaching a prism sheet to a support sheet.

Referring to FIG. 10, a base sheet roll SSF of a prism sheet is inserted into a first roller R1, and a mixed resin of a hydrophobic resin and a hydrophilic resin is prepared. A hard mold HM having a reverse image of a prism pattern to form is prepared. The base sheet roll SSF is transferred to the hard mold HM by rotating the first roller R1. The mixed resin is applied to the base sheet roll SSF and is compressed by the hard mold HM. When UV curing is performed, a prism sheet roll PSF having a prism portion PP including first and second prism patterns P1 and P2 is manufactured. In this instance, the prism portion PP, in which a hydrophobic resin and a hydrophilic resin are mixed, exists.

As the layer SSF goes into the mold HM, the mixed resin is inserted with it, as shown at the resin insert IR. As the mold HM rotates, the material is pressed against base B to form the prism layer of resin material on roll SSF. As the resin is applied and molded, UV curing light L shines a UV light on the roll and resin to attach the resin to the roll and start the cure process of the prism layer PS.

The shape of the mold HM will be selected to provide the desired pattern and shape for P1 and P2. These will be formed by compression into base B by the mold HM.

Next, referring to FIG. 11, the prism sheet roll PSF is inserted into a second roller R2, and a support sheet roll SSPF is inserted into a third roller R3. The support sheet roll SSPF is transferred by rotating the third roller R3, and a UV resin layer is applied to one surface of the support sheet roll SSPF through a gravure roll GR. The support sheet roll SSPF, to which the UV resin layer is applied, is thermally cured in a thermal curing chamber having Zone 1, Zone 2, and Zone 3. Subsequently, the prism sheet roll PSF is transferred to a compression roller LR by rotating the second roller R2, in conjunction with rotating the pick-up roller, fourth roller R4, and the thermally cured support sheet roll SSPF is transferred to the compression roller LR. The prism sheet roll PSF and the support sheet roll SSPF are pressed by the compression roller LR and are attached to each other. The prism sheet roll PSF and the support sheet roll SSPF, that are attached to each other, are UV-cured in a UV curing chamber labeled UV zone as being pulled forward by roller R4. In this instance, a hydrophobic resin and a hydrophilic resin of the prism sheet roll PSF are phase-separated. The hydrophilic resin is disposed at the top, and the hydrophobic resin is disposed below the hydrophilic resin. The resin contains mixed material of hydrophobic and hydrophilic resins in the desired ratio. Thus, based on the height H1, as compared to the height H2 and overall volume of the prism P1, the desired proportions of the two types of resin are provided in the mixed resin.

The proper volume ratio of hydrophilic as compared to hydrophobic can be calculated based on the shape and size of the prism P1. The two resins will phase separate as part of just prior to of the curing process so that the hydrophilic resin portion CH will migrate to the peak H1 and the hydrophobic resin portion will migrate to the base of SH1 and form all of P2.

Thus, a hydrophilic portion CH is formed at an upper part of the first prism pattern P1 of the prism sheet roll PSF, a first hydrophobic portion SH1 is formed at a lower part of the first prism pattern P1, and a second hydrophobic portion SH2 is formed throughout the entire of the second prism pattern P2.

During compression by roller LR, the prism layer P1 is pressed into the resin to the depth of height H1. The amount of force applied by compression roller layer LR can vary and is selected by the operator to achieve this depth of penetration. The height H1 will be known after the film PSF of FIG. 10 is fully cured. Thereafter, the amount of compression force applied by compression roller LR is adjusted to press the prism layer P1 at least to the desired depth H1 into the resin layer UR. In one embodiment, some small portion of the hydrophobic layer SH1 at level H2 is also pressed into resin layer UR; this is acceptable. It may be desired to apply slightly more compressive force than needed to insert the prism P1 into the resin layer UR, to ensure that all of the hydrophilic resin CH is fully embedded in the layer UR and not exposed. The prism P1 can have some portion, 5%, 10%, or 15%, of the hydrophobic layer SH1 also embedded in the layer UR. This will ensure that none of the hydrophilic resin CH is exposed, and is fully embedded and enclosed by resin UR in this embodiment. The resin UR is waterproof and watertight. Therefore, any portion of prism P1 that is embedded in layer UR will be protected from any contact with water.

In other embodiments, the prism P1 is pressed into the layer UR before curing with the selected for so that it is at an exact depth as close as possible in practice and operation to right at the height H1.

Afterwards, the support sheet roll SSPF attached to the prism sheet roll PSF are laminated with a polarizer sheet roll, and the polarizer sheet roll, the support sheet roll SSPF, and the prism sheet roll PSF are integrated and attached to manufacture the optical film OPT. The optical film OPT manufactured thus is cut to a desired size and is used to be attached to the lower surface of the liquid crystal display.

As described above, the liquid crystal display according to the first embodiment of the invention forms some of the prism patterns of the prism sheet, that are inserted into the UV resin layer, using a hydrophilic material and forms remaining prism patterns using a hydrophobic material, thereby preventing the moisture from penetrating between the prism patterns due to the capillary phenomenon. Thus, the embodiment of the invention can prevent a reduction in the image quality of the liquid crystal display and improve the display reliability.

Figure 12:
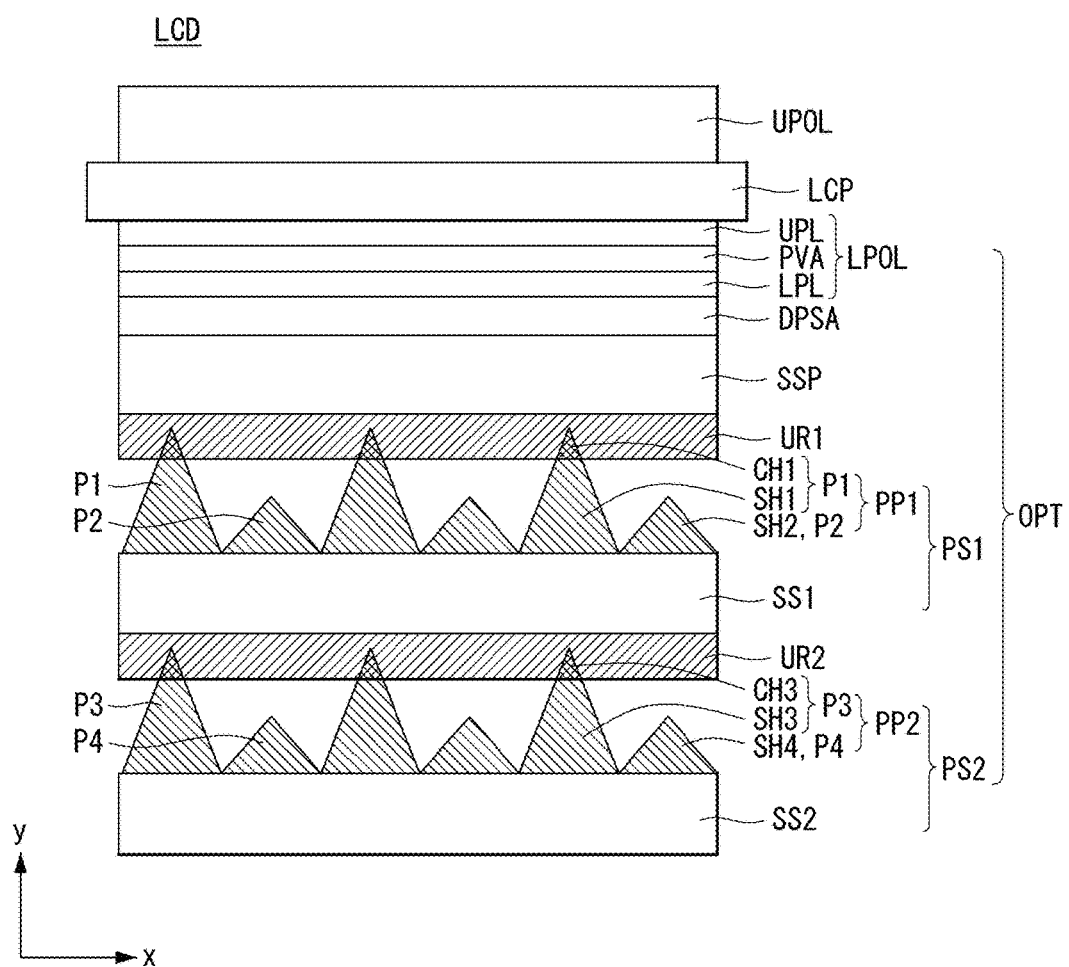
FIG. 12 is a cross-sectional view of a liquid crystal display according to a second embodiment of the invention.

Hereinafter, a liquid crystal display according to a second embodiment of the invention is described with reference to FIG. 12. FIG. 12 is a cross-sectional view of a liquid crystal display according to a second embodiment of the invention.

Referring to FIG. 12, a liquid crystal display LCD according to a second embodiment of the invention includes a liquid crystal display panel LCP, an upper polarizer UPOL, and an optical film OPT. The optical film OPT includes a lower polarizer LPOL, a support sheet SSP, a first UV resin layer UR1, a first prism sheet PS1, a second UV resin layer UR2, and a second prism sheet PS2.

Unlike the liquid crystal display LCD according to the first embodiment of the invention, the liquid crystal display LCD according to the second embodiment of the invention further includes the second prism sheet PS2 attached to a lower part of the first prism sheet PS1 using the second UV resin layer UR2. Since configurations of the liquid crystal display panel LCP, the upper polarizer UPOL, the lower polarizer LPOL, the support sheet SSP, the first UV resin layer UR1, and the first prism sheet PS1 are substantially the same as the first embodiment of the invention, a further description may be briefly made or may be entirely omitted.

The second UV resin layer UR2 is positioned below the first prism sheet PS1 and attaches the first prism sheet PS1 to the second prism sheet PS2. The second UV resin layer UR2 may use a resin having adhesive characteristic and UV curing characteristic. It is preferable, but not required, that the second UV resin layer UR2 has a thickness of 1 µm to 50 µm, so as to efficiently attach the first prism sheet PS1 positioned on the second UV resin layer UR2 to the second prism sheet PS2 positioned below the second UV resin layer UR2.

The second prism sheet PS2 is positioned below the second UV resin layer UR2. The second prism sheet PS2 includes a second prism portion PP2, in which prism patterns are formed on a second base sheet SS2. The second prism portion PP2 includes third prism patterns P3 each having a first height and fourth prism patterns P4 each having a second height.

The liquid crystal display according to the embodiment of the invention has the structure, in which the first prism sheet PS1 is attached to the second prism sheet PS2 using the second UV resin layer UR2. In particular, it is preferable, but not required, that some of the plurality of prism patterns P3 and P4 of the second prism portion PP2 included in the second prism sheet PS2 are inserted into the second UV resin layer UR2. At least one third prism pattern P3 of the second prism sheet PS2 according to the embodiment of the invention includes a second hydrophilic portion CH3 and a third hydrophobic portion SH3, and the fourth prism pattern P4 includes a fourth hydrophobic portion SH4.

The embodiment of the invention reduces an adhesive force between the second prism portion PP2 of the second prism sheet PS2 and a liquid by forming a portion of the second prism portion PP2, that is exposed to the outside, using the hydrophobic material, thereby reducing a capillary phenomenon. Thus, the embodiment of the invention can prevent the external moisture from penetrating between the second prism sheet PS2 and the second UV resin layer UR2 by forming the third hydrophobic portion SH3 of the third prism pattern P3 and the fourth hydrophobic portion SH4 of the fourth prism pattern P4, that are exposed to the outside, using the hydrophobic material.

According to one embodiment of the invention, a longitudinal direction of peaks Pk of the first and second prism patterns P1 and P2 of the first prism portion PP1 included in the first prism sheet PS1 is an x-axis direction, and a longitudinal direction of peaks Pk of the third and fourth prism patterns P3 and P4 of the second prism portion PP2 included in the second prism sheet PS2 is the x-axis direction as well. However, the embodiments of the invention are not limited thereto. For example, the longitudinal direction of the peaks of the first and second prism patterns P1 and P2 of the first prism portion PP1 included in the first prism sheet PS1 may be the x-axis direction, and the longitudinal direction of the peaks of the third and fourth prism patterns P3 and P4 of the second prism portion PP2 included in the second prism sheet PS2 may be a y-axis direction in a further embodiment of the invention. Thus, light incident from a light source passes through the first prism sheet PS1 and the second prism portion PP2 and may be concentrated to have a Gaussian distribution with respect to a normal line to the surface of the liquid crystal display panel LCP.

The liquid crystal display LCD according to the second embodiment of the invention may be manufactured by additionally forming a second prism sheet roll using an additional hard mold based on the method of manufacturing the liquid crystal display according to the first embodiment of the invention. In a process for laminating a first prism sheet roll and a support sheet roll using a compression roller, a UV resin layer may be formed on a lower surface of the first prism sheet roll, and then the second prism sheet roll may be laminated together with the first prism sheet roll and the support sheet roll. Afterwards, a polarizer sheet roll may be laminated together with them. Hence, the optical film may be manufactured by integrating and attaching the lower polarizer, the support sheet, the first UV resin layer, the first prism sheet, the second UV resin layer, and the second prism sheet. The optical film thus manufactured may be cut to a desired size and may be used to be attached to the lower surface of the liquid crystal display panel.

As described above, the liquid crystal display according to the second embodiment of the invention can provide an integral the optical film manufactured by attaching the lower polarizer, the support sheet, the first prism sheet, and the second prism sheet. Further, the embodiment of the invention forms some of the prism patterns of the prism sheet, that are inserted into the UV resin layer, using a hydrophilic material and forms remaining prism patterns using a hydrophobic material, thereby preventing the moisture from penetrating between the prism patterns due to the capillary phenomenon. Thus, the embodiment of the invention can prevent a reduction in the image quality of the liquid crystal display and improve the display reliability.

Figure 13:
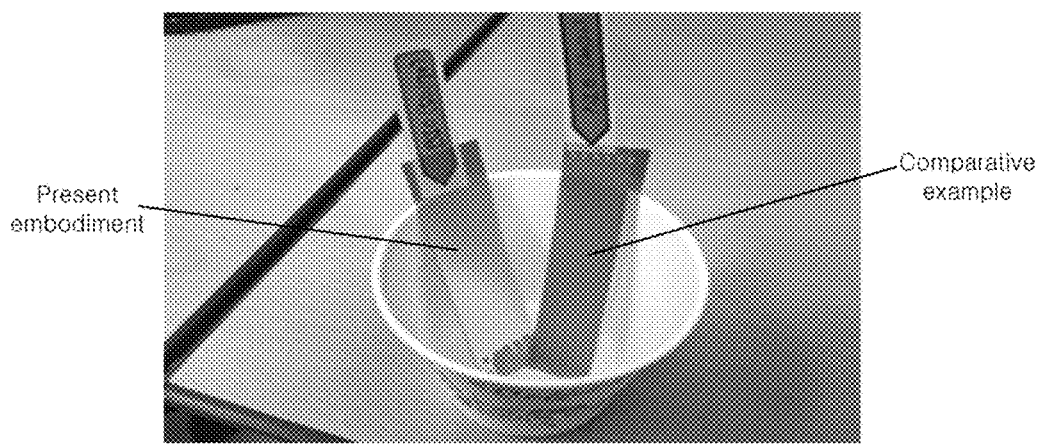
FIG. 13 is an image illustrating a result of a water immersion test of optical films according to a comparative example and an embodiment of the invention.
Figure 14:
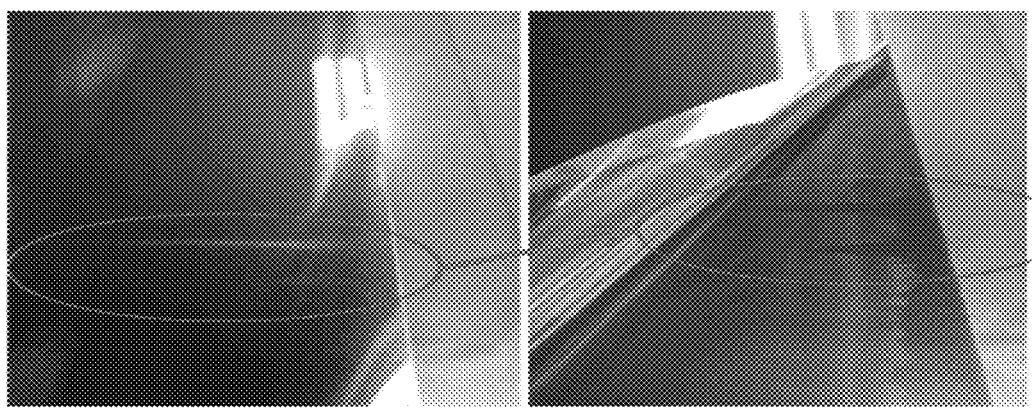
FIG. 14 are two different images illustrating a result of a high temperature/high humidity test conducted on a liquid crystal display including an optical film according to a comparative example.

Hereinafter, a result of tests conducted on optical films according to a comparative example and an embodiment of the invention is described. FIG. 13 is an image illustrating a result of a water immersion test of optical films according to a comparative example and an embodiment of the invention. FIG. 14 shows two photographs illustrating the result of a high temperature/high humidity test conducted on a liquid crystal display including an optical film according to a comparative example.

In an optical film made for the comparative example, both first and second prism patterns P1 and P2 of a prism portion PP were entirely formed using a hydrophilic resin and had the structure shown in FIG. 6. As can be seen in the area highlighted by the circle in each of the two images, moisture has entered the display and caused significant damage.

On the other hand, in an optical film according to an embodiment of the invention as shown in FIG. 13, a hydrophilic portion CH of a first prism pattern P1 of a prism portion PP was formed using a hydrophilic resin, and a first hydrophobic portion SH1 of the first prism pattern P1 and a second hydrophobic portion SH2 of a second prism pattern P2 were formed using a hydrophobic resin.

Referring to FIG. 13, the optical films manufactured according to the comparative example and the embodiment of the invention were both partially immersed in a cup filled with water for several minutes (not shown). As a result, moisture penetrated close to the top of the optical film that was made according to the comparative example. On the other hand, moisture penetrated only into a lower part of the optical film made according to the various embodiments of the invention. FIG. 13 shows the two films in a dry cup C after they have been removed from the water.

Moreover, referring to FIG. 14, a high temperature/high humidity test was conducted on a liquid crystal display including the optical film made according to the comparative example. As a result, a capillary phenomenon was generated in the optical film, and moisture penetrated into the optical film, as can be seen in the two different images of FIG. 14.

As can be seen from the above result, the generation of the capillary phenomenon and the moisture penetration in the optical film can be prevented by forming some of the prism patterns of the prism sheet, that are inserted into a UV resin layer, using a hydrophilic material and forming remaining patterns using a hydrophobic material.

Hereinafter, a peeling force of the prism sheet according to the embodiment of the invention and luminance characteristic of the liquid crystal display are described depending on an insertion degree of the prism portion of the prism sheet, that is inserted into the UV resin layer of the support sheet.

In the liquid crystal display shown in FIG. 5 according to the embodiment of the invention, a diffusion sheet was added to a lower part of the prism sheet to constitute the liquid crystal display. A luminance, a color coordinate, and a luminance rate were measured depending on a height of a hydrophilic portion of a first prism pattern, that is inserted into a UV resin layer and were represented in the following Table 1. Further, a peeling force of a prism sheet was measured depending on the height of the hydrophilic portion of the first prism pattern, that is inserted into the UV resin layer and was represented in the following Table 2.

TABLE 2

| | | Height of hydrophilic portion inserted into UV resin layer (μm) | | |
| --- | --- | --- | --- | --- |
| | Sample | 3.5 | 4.5 | 5.5 |
| Peeling | #1 | 2.248 | 2.534 | 2.791 |
| | #2 | 2.270 | 2.485 | 2.959 |
| | #3 | 2.400 | 2.591 | 2.959 |
| | #4 | 2.400 | 2.674 | 2.960 |
| | #5 | 2.505 | 2.395 | 2.597 |

As indicated by the above Table 1, when the height of the hydrophilic portion inserted into the UV resin layer was 0, 3.5 μm, 5.5 μm, 7.5 μm, 8.5 μm, 10 μm, and 11 μm, white coordinates showed almost equal values. However, when the height of the hydrophilic portion inserted into the UV resin layer was 11 μm, the luminance of 182.2 nit and the luminance rate of 79.5% were measured. Namely, the luminance and the luminance rate were greatly reduced.

As indicated by the above Table 2, when the height of the hydrophilic portion inserted into the UV resin layer was 3.5 μm, 4.5 μm, and 5.5 μm, the peeling force ranging from 2.248N to 2.960N was measured. Namely, as the height of the hydrophilic portion inserted into the UV resin layer increased, the peeling force increased. The present inventors found that the peeling force was obtained from an equation of 1.485 (constant)+(0.2444×(height (μm) of hydrophilic portion inserted into UV resin layer)) through various experiments. Thus, the peeling force may be obtained by substituting heights other than the height of the hydrophilic portion inserted into the UV resin layer for the height of the hydrophilic portion inserted into the UV resin layer in the above equation.

As can be seen from the above Tables, as the height of the hydrophilic portion inserted into the UV resin layer increased, the peeling force increased. However, the luminance and the luminance rate were reduced. Thus, the embodiment of the invention may set the height of the hydrophilic portion of the first prism pattern, that is inserted into the UV resin layer, to 1 μm to 10 μm, in order to maintain the peeling force at a proper level while preventing an excessive reduction in the luminance and the luminance rate.

As described above, the liquid crystal display according to the embodiments of the invention forms some of the prism patterns of the prism sheet, that are inserted into the UV resin layer, using a hydrophilic material and forms remaining prism patterns using a hydrophobic material, thereby preventing the moisture from penetrating between the prism patterns due to the capillary phenomenon. Thus, the embodi-

TABLE 1

| | Sample | | | | | | |
| --- | --- | --- | --- | --- | --- | --- | --- |
| | #1 | #2 | #3 | #4 | #5 | #6 | #7 |
| Height of hydrophilic portion of first prism pattern inserted into UV resin layer (μm) | 0 | 3.5 | 5.5 | 7.5 | 8.5 | 10 | 11 |
| Luminance (nit) | 231.4 | 216 | 211 | 203.9 | 197 | 190.1 | 182.2 |
| Color coordinate (Wx/Wy) | 0.275/ 0.278 | 0.271/ 0.275 | 0.273/ 0.276 | 0.273/ 0.275 | 0.273/ 0.275 | 0.273/ 0.275 | 0.273/ 0.275 |
| Luminance rate (Reflection of color coordinate) (%) | 101 | 94.3 | 92.1 | 89 | 86 | 83 | 79.5 | ment of the invention can prevent a reduction in the image quality of the liquid crystal display and improve the display reliability.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
a display panel;
a polarizer attached to a lower surface of the display panel;
a support sheet positioned on a lower surface of the polarizer and integrated with the polarizer;
a first UV resin layer positioned on a lower surface of the support sheet; and
a first prism sheet positioned on a lower surface of the first UV resin layer and integrated with the support sheet,
wherein the first prism sheet includes:
a first base sheet;
a prism portion positioned on the first base sheet and including at least one first prism pattern including a first hydrophobic portion,
wherein the first prism pattern further includes a hydrophilic portion on the first hydrophobic portion, and
wherein the hydrophilic portion is a portion of the first prism pattern inserted into the first UV resin layer, and the first hydrophobic portion is a remaining portion except the hydrophilic portion from the first prism pattern.

2. The liquid crystal display of claim 1, wherein the first hydrophobic portion is made of a hydrophobic material, and the hydrophilic portion is made of a hydrophilic material.

3. The liquid crystal display of claim 1, wherein the prism portion further includes at least one second prism pattern having a height less than a height of the first prism pattern, and
wherein the second prism pattern is entirely composed of a second hydrophobic portion.

4. The liquid crystal display of claim 1, wherein a height of the hydrophilic portion is 1% to 20% with respect to a total height of 100% of the first prism pattern.

5. The liquid crystal display of claim 4, wherein the height of the hydrophilic portion is 1 μm to 10 μm.

6. The liquid crystal display of claim 1, wherein a plan area of the hydrophilic portion is 1% to 10% with respect to a total plan area of 100% of the first prism sheet.

7. The liquid crystal display of claim 1, further comprising:
a second UV resin layer on a lower surface of the first prism sheet; and
a second prism sheet on a lower surface of the second UV resin layer.

8. The liquid crystal display of claim 7, wherein the second prism sheet includes:
a second base sheet; and
a prism portion positioned on the second base sheet and including at least one third prism pattern including a third hydrophobic portion.

9. The liquid crystal display of claim 1, wherein the polarizer at least includes a core layer.

10. The liquid crystal display of claim 9, wherein the polarizer further includes a protective layer on at least one surface of the core layer.

11. The liquid crystal display of claim 1, further comprising a backlight unit providing light for a lower part of the display panel, the backlight unit including a light source, a light guide plate, and a reflective plate.

12. A method of manufacturing a liquid crystal display comprising:
inserting a base sheet roll into a first roller, applying a mixed resin of a hydrophobic resin and a hydrophilic resin to the base sheet roll, and forming a prism sheet roll including a first prism pattern using a hard mold;
inserting the prism sheet roll into a second roller;
inserting a support sheet roll into a third roller and forming an UV resin layer on the support sheet roll;
attaching the prism sheet roll to the support sheet roll using a compression roller and performing UV curing on the prism sheet roll to form a hydrophobic portion and a hydrophilic portion in the first prism pattern of the prism sheet roll;
attaching the support sheet roll, that is attached to the prism sheet roll, to a polarizer sheet roll and cutting them to manufacture an optical film; and
attaching the optical film to a lower surface of a display panel,
wherein the first prism pattern includes the hydrophilic portion on the hydrophobic portion, and
wherein the hydrophilic portion is a portion of the first prism pattern inserted into the first UV resin layer, and the hydrophobic portion is a remaining portion except the hydrophilic portion from the first prism pattern.

13. The method of claim 12, wherein the forming of the hydrophobic portion and the hydrophilic portion in the first prism pattern of the prism sheet roll includes phase-separating the mixed resin forming the first prism pattern into the hydrophobic portion and the hydrophilic portion when the UV curing is performed on the prism sheet roll.

* * * * *